(12) United States Patent
Ortmann et al.

(10) Patent No.: US 11,630,090 B2
(45) Date of Patent: Apr. 18, 2023

(54) SAMPLE DISPATCHING WITH FLUIDIC SAMPLE RETAINING

(71) Applicant: Agilent Technologies, Inc., Santa Clara, CA (US)

(72) Inventors: Thomas Ortmann, Straubenhardt/Ottenhausen (DE); Thomas Glauner, Forbach (DE)

(73) Assignee: Agilent Technologies, Inc., Santa Clara, CA (US)

( * ) Notice: Subject to any disclaimer, the term of this patent is extended or adjusted under 35 U.S.C. 154(b) by 211 days.

(21) Appl. No.: 16/943,868

(22) Filed: Jul. 30, 2020

(65) Prior Publication Data

US 2021/0033572 A1 Feb. 4, 2021

(51) Int. Cl.
*G01N 30/20* (2006.01)
*G01N 30/38* (2006.01)

(52) U.S. Cl.
CPC ............. *G01N 30/20* (2013.01); *G01N 30/38* (2013.01); *G01N 2030/202* (2013.01); *G01N 2030/207* (2013.01); *G01N 2030/385* (2013.01)

(58) Field of Classification Search
CPC ....... G01N 2030/202; G01N 2030/207; G01N 2030/385; G01N 30/20; G01N 30/24; G01N 30/34; G01N 30/38
See application file for complete search history.

(56) References Cited

U.S. PATENT DOCUMENTS

| | | | |
|---|---|---|---|
| 4,982,597 A | 1/1991 | Berger | |
| 2006/0196282 A1* | 9/2006 | Tatsumi | G01N 35/1097 73/863.83 |
| 2015/0316455 A1* | 11/2015 | Anderer | B01F 35/2209 366/152.2 |
| 2016/0334031 A1 | 11/2016 | Shoykhet et al. | |
| 2017/0343518 A1* | 11/2017 | Thielsch | G01N 30/22 |
| 2017/0343520 A1* | 11/2017 | Ortmann | G01N 30/04 |
| 2018/0128787 A1 | 5/2018 | Hollnagel et al. | |
| 2018/0128792 A1 | 5/2018 | Wachinger et al. | |
| 2018/0246073 A1* | 8/2018 | Glatz | G01N 30/36 |
| 2019/0170782 A1* | 6/2019 | Nishio | G01N 30/24 |

FOREIGN PATENT DOCUMENTS

| | | | |
|---|---|---|---|
| DE | 102017125486 A1 * | 1/2018 | ............ G01N 30/08 |
| EP | 309596 A1 | 9/1987 | |
| EP | 1577012 A1 | 9/2005 | |
| WO | 2010139359 A1 | 12/2010 | |
| WO | 2016075503 A1 | 5/2016 | |

* cited by examiner

*Primary Examiner* — John Fitzgerald
*Assistant Examiner* — Gedeon M Kidanu

(57) ABSTRACT

A sample dispatcher for a fluid separation apparatus includes a sampling path including a sampling volume, a sampling unit, and a retaining unit. The sampling unit receives a fluidic sample, and the sampling volume temporarily stores an amount of the received sample. The retaining unit receives and retains from the sampling volume at least a portion of the stored sample, and has different retention characteristics for different components of the sample. A switching unit is coupled to the sampling path, a sampling fluid drive, a mobile phase drive, and a separating device. In a feed injection configuration of the switching unit, the mobile phase drive, the separating device, and the sampling path are coupled together in a coupling point for combining a flow from the sampling fluid drive containing the fluidic sample retained by the retaining unit with a flow of the mobile phase from the mobile phase drive.

15 Claims, 6 Drawing Sheets

SAMPLE DISPATCHING WITH FLUIDIC SAMPLE RETAINING

RELATED APPLICATIONS

This application claims priority to UK Application No. GB 1911000.6, filed Aug. 1, 2019, the entire contents of which are incorporated herein by reference.

TECHNICAL FIELD

The present invention relates to sample dispatching in particular for chromatographic sample separation.

BACKGROUND

In high performance liquid chromatography (HPLC), a liquid has to be provided usually at a very controlled flow rate (e. g. in the range of microliters to milliliters per minute) and at high pressure (typically 20-100 MPa, 200-1000 bar, and beyond up to currently 200 MPa, 2000 bar) at which compressibility of the liquid becomes noticeable. For liquid separation in an HPLC system, a mobile phase comprising a sample fluid (e.g. a chemical or biological mixture) with compounds to be separated is driven through a stationary phase (such as a chromatographic column packing), thus separating different compounds of the sample fluid which may then be identified. The term compound, as used herein, shall cover compounds which might comprise one or more different components.

The mobile phase, for example a solvent, is pumped under high pressure typically through a chromatographic column containing packing medium (also referred to as packing material or stationary phase). As the sample is carried through the column by the liquid flow, the different compounds, each one having a different affinity to the packing medium, move through the column at different speeds. Those compounds having greater affinity for the stationary phase move more slowly through the column than those having less affinity, and this speed differential results in the compounds being separated from one another as they pass through the column. The stationary phase is subject to a mechanical force generated in particular by a hydraulic pump that pumps the mobile phase usually from an upstream connection of the column to a downstream connection of the column. As a result of flow, depending on the physical properties of the stationary phase and the mobile phase, a relatively high-pressure drop is generated across the column.

The mobile phase with the separated compounds exits the column and passes through a detector, which registers and/or identifies the molecules, for example by spectrophotometric absorbance measurements. A two-dimensional plot of the detector measurements against elution time or volume, known as a chromatogram, may be made, and from the chromatogram the compounds may be identified. For each compound, the chromatogram displays a separate curve feature also designated as a "peak". Efficient separation of the compounds by the column is advantageous because it provides for measurements yielding well defined peaks having sharp maxima inflection points and narrow base widths, allowing excellent resolution and reliable identification and quantitation of the mixture constituents. Broad peaks, caused by poor column performance, so called "Internal Band Broadening" or poor system performance, so called "External Band Broadening" are undesirable as they may allow minor components of the mixture to be masked by major components and go unidentified.

SUMMARY

It is an object of the invention to provide an improved sample dispatching, preferably for chromatographic sample separation.

A preferred embodiment provides a sample dispatcher for a fluid separation apparatus, wherein the fluid separation apparatus comprises a mobile phase drive, configured for driving a mobile phase, and a separating device configured for separating a portion of a fluidic sample when comprised within the mobile phase. The sample dispatcher comprises a sampling path comprising a sampling volume, a sampling unit, and a retaining unit. The sampling unit is configured for receiving the fluidic sample. The sampling volume is configured for temporarily storing an amount of the received fluidic sample. The retaining unit is configured for receiving and retaining from the sampling volume at least a portion of the fluidic sample stored in the sampling volume, and the retaining unit comprises different retention characteristics for different components of the fluidic sample. The sample dispatcher further comprises a switching unit coupling to the sampling path, a sampling fluid drive, the mobile phase drive, and the separating device. The sampling fluid drive is configured for moving at least a portion of the fluidic sample received by the sampling unit into the sampling volume, for moving at least a portion of the fluidic sample stored in the sampling volume into the retaining unit, and for introducing via the switching unit at least a portion of the fluidic sample retained by the retaining unit into the mobile phase upstream to the separating device. The retaining unit thus provides an additional degree of freedom e.g. for treating the fluidic sample, for example by providing sample preparation, sample cleanup, sample desalting, sample concentration, sample modification or the like, before introducing the fluidic sample into the mobile phase.

In a feed injection configuration of the switching unit, the mobile phase drive, the separating device, and the sampling path are coupled together in a first coupling point, and the sampling fluid drive is coupled to the sampling path for combining into the first coupling point a flow from the sampling fluid drive with a flow of the mobile phase from the mobile phase drive, wherein the flow from the sampling fluid drive is through the sampling path and containing the fluidic sample retained by the retaining unit. The feed injection configuration (also referred to herein as the fourth configuration) is useful for feed injecting the fluidic sample or at least a portion thereof into the mobile phase, thus providing all benefits known from such feed injection scheme, as described e.g. in US 2017/343520 A1 by the same applicant.

In a preferred embodiment, the sampling volume, the sampling unit, and the retaining unit are coupled in series within the sampling path. It may also be possible to provide a coupling in parallel at least of some of the components.

In a preferred embodiment, the sampling unit comprises a needle and a needle seat, wherein in an open position of the sampling unit the needle is configured to be separated from the needle seat in order to receive the fluidic sample, and in a closed position of the sampling unit the needle is configured to be fluidically sealingly coupled with the needle seat. The needle allows to introduce fluidic sample into the sampling path, e.g. by aspirating such fluidic sample from a vessel, a vial, a conduit providing such fluidic sample e.g. in the sense of an online sampling, or the like.

In a preferred embodiment, the sampling volume comprises at least one of a group of: a sample loop, a sample volume, a trap volume, a trap column, a fluid reservoir, a capillary, a tube, a microfluidic channel structure. While the main functionality of the sample volume is to at least temporarily store fluidic sample, the sample volume may in addition have further capabilities e.g. for sample treatment.

In a preferred embodiment, the retaining unit comprises at least one of a group of: one or more chromatographic columns, preferably at least one of a trapping column, a HILIC column, a guard column, an SPE column, one or more coated capillaries, one or more filters preferably one or more filter frits. In case of plural chromatographic columns and/or coated capillaries, at least two of the chromatographic columns and/or coated capillaries having a different chromatographic separation mechanism. In case of plural chromatographic columns and/or coated capillaries at least two of the chromatographic columns and/or coated capillaries are preferably coupled to each other in a serial connection.

The retaining unit can be a single unit comprising only one dedicated retaining property. Alternatively, the retaining unit may comprise plural units, which may be housed individually or combined, preferably at least some of the plural units having different retaining properties, e.g. different retention characteristics for different components. Such plural units may be arranged in parallel or in a serial manner.

In a preferred embodiment, the switching unit comprises a valve coupling to the sampling path, the sampling fluid drive, the mobile phase drive, and the separating device. The valve may be a rotational valve or a translatory valve as known in the art. Typical rotational valves may comprise a rotor and a stator configured for providing a rotational movement with respect to each other in order to switch the valve between different positions. Each of the rotor and the stator, or both, may comprise one or more ports for fluidically coupling external elements to the valve, one or more static grooves configured for providing a fluidic connection between ports, wherein the static grooves will remain static when providing a rotational movement between rotor and stator, and one or more (dynamic) grooves configured for providing a fluidic connection between ports, wherein the (dynamic) grooves can be moved relative to the ports when providing a rotational movement between rotor and stator. The same applies, mutatis mutandis, when using a translatory valve with the translatory valve providing a translatory movement instead of the rotational movement (as explained for the rotational valve).

In preferred embodiments, the switching unit comprises one or more of the following configurations:

In a first configuration (which may also be referred to as draw or load configuration) of the switching unit, the mobile phase drive is coupled to the separating device, and the sampling fluid drive is coupled to the sampling path for at least one of: receiving the fluidic sample by the sampling unit, and moving the portion of the fluidic sample received by the sampling unit into the sampling volume, wherein a first end of the sampling fluid drive is coupled to the sampling path. The first configuration allows loading (e.g. drawing in or aspirating) the fluidic sample into the sampling path and preferably into the sampling volume.

In a second configuration (which may also be referred to as purge or loading configuration) of the switching unit, the mobile phase drive is coupled to the separating device, and the sampling fluid drive is coupled to the sampling path for at least one of: receiving the fluidic sample by the sampling unit, and moving the portion of the fluidic sample received by the sampling unit into the sampling volume, wherein a first end of the sampling fluid drive is coupled to the sampling path, and a second end of the sampling path is open and allowing a fluid transport beyond the second end. The second configuration allows transporting (e.g. pushing or moving) fluidic sample stored in the sampling volume into the retaining unit.

In a third configuration (which may also be referred to as compress configurations) of the switching unit, the mobile phase drive is coupled to the separating device, and the sampling fluid drive is coupled to the sampling path for compressing or decompressing the fluidic sample in the sampling path, wherein a first end of the sampling fluid drive is coupled to the sampling path, and a second end of the sampling path is closed and disabling a fluid transport beyond the second end. The third configuration thus allows compressing or decompressing the fluidic sample e.g. in order to adapt a pressure within the sampling path. This can be useful, for example, for compressing the fluidic sample before introducing into the mobile phase in order to avoid or at least reduce pressure variations in the mobile phase as resulting from introducing the fluidic sample. Accordingly, decompressing the fluidic sample may be useful for adapting the pressure in the sampling path e.g. to an ambient condition, for example before separating the needle from the needle seat, or after a previous step of introducing fluidic sample into the mobile phase.

In a flow through configuration of the switching unit, the sampling path is coupled between the mobile phase drive and the separating device for introducing the portion of the fluidic sample retained by the retaining unit into the mobile phase. The flow through configuration is useful for switching the fluidic sample directly into the mobile phase, thus providing all benefits known from the flow through injection scheme, as described e.g. in US 2016/0334031 A1 by the same applicant.

In a preferred embodiment comprising the feed injection and flow through configuration, both sample introduction types, namely feed injection and flow through injection, can be applied with the same switching unit, thus allowing a user to select the appropriate sample introduction type for a specific application.

In a preferred embodiment, the sampling fluid drive comprises at least one of a group of: metering device, a fluid pump. The metering device is preferably configured for precisely metering a desired fluid volume. The metering device may comprise a syringe, a pump, a flow source, a proportioning valve with a pump, or any other adequate facility for metering a desired fluid volume as known in the art.

In a preferred embodiment, the sampling fluid drive comprises a metering device comprised within the sampling path, and a fluid pump external to the sampling path and coupling to the switching unit. While the sampling fluid drive may be embodied by a single unit, such as the metering device, it may be beneficial to separate the functionalities of metering and pumping fluid, for example in order to reduce the time and effort required for applying one or more solvents into the sampling path.

In a preferred embodiment, the sampling fluid drive comprises at least one of:

in the first configuration of the switching unit, the metering device is configured for moving the portion of the fluidic sample received by the sampling unit into the sampling volume;

in the second configuration of the switching unit, the metering device is configured to enable pressurizing or depressurizing a fluid content within the retaining unit, preferably in that the switching unit fluidically blocks one end of the sampling path coupled to the switching unit;

in the third configuration of the switching unit, the fluid pump is configured for moving the portion of the fluidic sample stored in the sampling volume into the retaining unit; and in the feed injection configuration of the switching unit, the metering device is further configured for introducing the portion of the fluidic sample retained by the retaining unit into the mobile phase upstream to the separating device.

In a preferred embodiment, the sampling fluid drive is coupled in series within the sampling path, preferably between the sampling volume and the switching unit.

In a preferred embodiment, the sampling fluid drive comprises a fluid pump configured for driving an auxiliary fluid.

In a preferred embodiment, the sampling fluid drive comprises a first reservoir of the auxiliary fluid, wherein the auxiliary fluid preferably is a solvent or a solvent mixture and further preferably a chromatographically solvent.

In a preferred embodiment, a control unit is configured to control operation of the sample dispatcher, preferably at least one of operation of the sampling fluid drive and switching of the switching unit.

In a preferred embodiment, a fluid separation apparatus comprises a mobile phase drive, configured for driving a mobile phase, and a separating device configured for separating a portion of a fluidic sample when comprised within the mobile phase. The fluid separation apparatus further comprises a sample dispatcher, as in any one of the afore-described embodiments, configured for dispatching at least a portion of the fluidic sample to the fluid separation apparatus.

In a preferred embodiment, a method of dispatching at least a portion of a fluidic sample to a fluid separation apparatus is provided. The fluid separation apparatus comprises a mobile phase drive, configured for driving a mobile phase, and a separating device configured for separating a portion of a fluidic sample when comprised within the mobile phase. The method comprises temporarily storing an amount of the received fluidic sample, transferring an amount of the temporarily stored fluidic sample, retaining at least a portion of the transferred fluidic sample with different retention characteristics for different components of the fluidic sample, and introducing at least a portion of the retained fluidic sample into the mobile phase upstream to the separating device. Other portions of the transferred fluidic sample not being retained may also go into the mobile phase upstream to the separating device.

In a preferred embodiment, the method comprises at least one of sample washing or cleanup (e.g. in the sense of removing a contamination and/or an unwanted component in the fluidic sample not being retained by and/or having interacted with the retaining unit), sample concentration, sample desalting, biological, chemical, photochemical (e.g. using a light-transparent retaining unit and a light source (laser, LED etc.) of suitable wavelength and intensity) and/or thermal (e.g. using a retaining unit with a heat- and/or cooling-jacket, and/or using IR radiation) transformation and/or modification of the sample, in particular one of: derivatization, enzymatic digestion or cleavage or chemical reaction, derivatization, or any other type of sample preparation of the retained fluidic sample before introducing into the mobile phase.

Embodiments of the present invention might be embodied based on most conventionally available HPLC systems, such as the Agilent 1220, 1260 and 1290 Infinity LC Series (provided by the applicant Agilent Technologies).

One embodiment of an HPLC system comprises a pumping apparatus having a piston for reciprocation in a pump working chamber to compress liquid in the pump working chamber to a high pressure at which compressibility of the liquid becomes noticeable.

One embodiment of an HPLC system comprises two pumping apparatuses coupled either in a serial or parallel manner. In the serial manner, as disclosed in EP 309596 A1, an outlet of the first pumping apparatus is coupled to an inlet of the second pumping apparatus, and an outlet of the second pumping apparatus provides an outlet of the pump. In the parallel manner, an inlet of the first pumping apparatus is coupled to an inlet of the second pumping apparatus, and an outlet of the first pumping apparatus is coupled to an outlet of the second pumping apparatus, thus providing an outlet of the pump. In either case, a liquid outlet of the first pumping apparatus is phase shifted, preferably essentially by 180 degrees, with respect to a liquid outlet of the second pumping apparatus, so that only one pumping apparatus is supplying into the system while the other is intaking liquid (e.g. from the supply), thus allowing to provide a continuous flow at the output. However, it is clear that also both pumping apparatuses might be operated in parallel (i.e. concurrently), at least during certain transitional phases e.g. to provide a smooth(er) transition of the pumping cycles between the pumping apparatuses. The phase shifting might be varied in order to compensate pulsation in the flow of liquid as resulting from the compressibility of the liquid. It is also known to use three piston pumps having about 120 degrees phase shift. Also other types of pumps are known and operable in conjunction with the present invention.

The separating device preferably comprises a chromatographic column providing the stationary phase. The column might be a glass, metal, ceramic or a composite material tube (e.g. with a diameter from 50 µm to 5 mm and a length of 1 cm to 1 m) or a microfluidic column (as disclosed e.g. in EP 1577012 A1 or the Agilent 1200 Series HPLC-Chip/MS System provided by the applicant Agilent Technologies). The individual components are retained by the stationary phase differently and separate from each other while they are propagating at different speeds through the column with the eluent. At the end of the column they elute at least partly separated from each other. During the entire chromatography process the eluent might be also collected in a series of fractions. The stationary phase or adsorbent in column chromatography usually is a solid material. The most common stationary phase for column chromatography is silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface, which can be especially chemically modified, though in EBA a fluidized bed is used.

The mobile phase (or eluent) can be either a pure solvent or a mixture of different solvents. It can also contain additives, i.e. be a solution of the said additives in a solvent or a mixture of solvents. It can be chosen e.g. to adjust the retention of the compounds of interest and/or the amount of mobile phase to run the chromatography. The mobile phase can also be chosen so that the different compounds can be separated effectively. The mobile phase might comprise an organic solvent like e.g. methanol or acetonitrile, often diluted with water. For gradient operation water and organic solvent are delivered in separate containers, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid might comprise any type of process liquid, natural sample like juice, body fluids like plasma or it may be the result of a reaction like from a fermentation broth.

The fluid is preferably a liquid but may also be or comprise a gas and/or a supercritical fluid (as e.g. used in supercritical fluid chromatography—SFC—as disclosed e.g. in U.S. Pat. No. 4,982,597 A).

The pressure in the mobile phase might range from 2-200 MPa (20 to 2000 bar), in particular 10-150 MPa (100 to 1500 bar), and more particularly 50-130 MPa (500 to 1300 bar).

The HPLC system might further comprise a detector for detecting separated compounds of the sample fluid, a fractionating unit for outputting separated compounds of the sample fluid, or any combination thereof. Further details of HPLC system are disclosed with respect to the aforementioned Agilent HPLC series, provided by the applicant Agilent Technologies.

Embodiments of the invention can be partly or entirely embodied or supported by one or more suitable software programs or products, which can be stored on or otherwise provided by any kind of data carrier (such as, e.g., a non-transitory computer-readable or machine-readable medium), and which might be executed in or by any suitable data processing unit or control unit (such as, e.g., a computing device comprising one or more electronics-based processors, memories, and the like as appreciated by persons skilled in the art). Software programs or routines can be preferably applied in or by the control unit, e.g. a data processing system such as a computer, preferably for executing any of the methods described herein. For example, embodiments of the invention encompass a non-transitory computer-readable medium, comprising instructions stored thereon, that when executed on a processor, control or perform any of the methods disclosed herein.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or finer separated by the first separation criterion, thereby splitting up or separating a separate fraction into a plurality of sub-fractions.

In the context of this application, the term "fraction" may particularly denote such a group of molecules or particles of a fluidic sample which have one or more certain properties of the group of: mass, charge, volume, chemical or physical properties or interaction, etc. in common according to which the separation has been carried out. However, molecules or particles relating to one fraction can still have some degree of heterogeneity, i.e. can be further separated in accordance with another separation criterion. As well the term "fraction" may denote a portion of a solvent containing the aforementioned group of molecules.

In the context of this application, the term "sub-fractions" may particularly denote individual groups of molecules or particles all relating to a certain fraction which still differ from one another regarding one or more certain properties of the group of: mass, charge, volume, chemical or physical properties or interaction, etc. Hence, applying another separation criterion for the second separation as compared to the separation criterion for the first separation allows these groups to be further separated from one another by applying the other separation criterion, thereby obtaining the further separated sub-fractions. As well the term "sub-fraction" may denote a portion of a solvent containing the aforementioned individual group of molecules.

In the context of this application, the term "downstream" may particularly denote that a fluidic member located downstream compared to another fluidic member will only be brought in interaction with a fluidic sample after interaction with the other fluidic member (hence being arranged upstream). Therefore, the terms "downstream" and "upstream" relate to a flowing direction of the fluidic sample. The terms "downstream" and "upstream" may also relate to a preferred direction of the fluid flow between the two members being in downstream-upstream relation.

In the context of this application, the term "sample separation apparatus", "fluid separation apparatus" or similar may particularly denote any apparatus which is capable of separating different fractions of a fluidic sample by applying a certain separation technique. Particularly, two separation apparatus may be provided in such a sample separation apparatus when being configured for a two-dimensional separation. This means that the sample is first separated in accordance with a first separation criterion, and at least one or some of the fractions resulting from the first separation are subsequently separated in accordance with a second, different, separation criterion or more finely separated in accordance with the first separation criterion.

The term "separation unit", "separation device" or similar may particularly denote a fluidic member through which a fluidic sample is transferred, and which is configured so that, upon conducting the fluidic sample through the separation unit, the fluidic sample will be separated into different groups of molecules or particles (called fractions or sub-fractions, respectively). An example for a separation unit is a liquid chromatography column which is capable of trapping or retaining and selectively releasing different fractions of the fluidic sample.

In the context of this application, the term "fluid drive", "mobile phase drive" or similar may particularly denote any kind of pump which is configured for forcing a flow of mobile phase and/or a fluidic sample along a fluidic path. A corresponding liquid supply system may be configured for delivery of a single liquid or of two or more liquids in controlled proportions and for supplying a resultant mixture as a mobile phase. It is possible to provide a plurality of solvent supply lines, each fluidically connected with a respective reservoir containing a respective liquid, a proportioning valve interposed between the solvent supply lines and the inlet of the fluid drive, the proportioning valve configured for modulating solvent composition by sequentially coupling selected ones of the solvent supply lines with the inlet of the fluid drive, wherein the fluid drive is configured for taking in liquids from the selected solvent supply lines and for supplying a mixture of the liquids at its outlet. More particularly, the first fluid drive can be configured to drive the fluidic sample, usually mixed with, or injected into a flow of a mobile phase (solvent composition), through the first-dimension separation apparatus, whereas the second fluid drive can be configured for driving the fluidic sample fractions, usually mixed with a further mobile phase (solvent composition), after treatment (e.g. elution) by the first-dimension separation unit through the second-dimension separation apparatus.

In the context of this application, the term "flow coupler" or "coupling point" may particularly denote a fluidic component which is capable of unifying flow components from two fluid inlet terminals into one common fluid outlet terminal. For example, a bifurcated flow path may be provided in which two streams of fluids flow towards a bifurcation point and are unified to flow together through the fluid outlet terminal. At a bifurcation point where the fluid inlet terminals and the fluid outlet terminal are fluidically connected, fluid may flow from any source terminal to any destination terminal depending on actual pressure conditions. The flow coupler may act as a flow combiner for combining flow streams from the two fluid inlet terminals further flowing to the fluid outlet terminal. The flow coupler may provide for a permanent (or for a selective) fluid communication between the respective fluid terminals and connected conduits, thereby allowing for a pressure equilibration between these conduits. In certain embodiments, the flow coupler may also act as a flow splitter. A respective coupling point may be configured as one of the group consisting of a fluidic T-piece, a fluidic Y-piece, a fluidic X-piece, microfluidic junction, a group of at least 3 ports of a rotary valve, connectable together in at least one of configurations of the said rotary valve and a multi-entry port of a rotary valve.

In the context of this application, the term "valve" or "fluidic valve" may particularly denote a fluidic component which has fluidic interfaces, wherein upon switching the fluidic valve selective ones of the fluidic interfaces may be selectively coupled to one another so as to allow fluid to flow along a corresponding fluidic path, or may be decoupled from one another, thereby disabling fluid communication.

In the context of this application, the term "buffer" or "buffering" may particularly be understood as temporarily storing. Accordingly, the term "buffering fluid" is preferably understood as temporarily storing an amount of fluid, which may later be fully or partly retrieved from such unit buffering the fluid.

In the context of this application, the term "loop" may particularly be understood as a fluid conduit allowing to temporarily store an amount of fluid, which may later be fully or partly retrieved from the loop. Preferably, such loop has an elongation along the flow direction of the fluid and a limited mixing characteristic (e.g. resulting from dispersion), so that a spatial variation in composition in the fluid will be at least substantially maintained along the elongation of the loop. Accordingly, the term "sample loop" may be understood as a loop configured to temporarily store an amount of sample fluid. Further accordingly, a sample loop is preferably configured to at least substantially maintain a spatial variation in the sample fluid (along the flow direction of the sample), as e.g. resulting from a previous chromatographic separation of the sample fluid, during temporarily storing of such sample fluid.

In the context of this application, the term "retain", "retaining", or similar, in particular in context with "unit", may particularly be understood as providing a surface (e.g. a coating) and/or a stationary phase configured for interacting with a fluid in the sense of having a desired retention characteristics with one or more components contained in the fluid. Such desired retention characteristics shall be understood as an intentionally applied retention, i.e. a retention beyond an unintentional side-effect. Accordingly, the term "retaining unit" may be understood as a unit in a fluidic path being configured for interacting with a sample fluid for providing a desired retention characteristic for one or more components contained in the sample fluid.

In the context of this application, the term "couple", "coupled", "coupling", or similar, in particular in context with "fluidic" or "fluidically", may particularly be understood as providing a fluidic connection at least during a desired time interval. Such fluidic connection may not be permanent but allows a (passive and/or active) transport of fluid between the components fluidically coupled to each other at least during such desired time interval. Accordingly, fluidically coupling may involve active and/or passive components, such as one or more fluid conduits, switching elements (such as valves), et cetera.

The fluid separation apparatus may be configured to drive the mobile phase through the system by means of a high pressure, particularly of at least 400 bar, more particularly of at least 1000 bar.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

DETAILED DESCRIPTION

Figure 1:
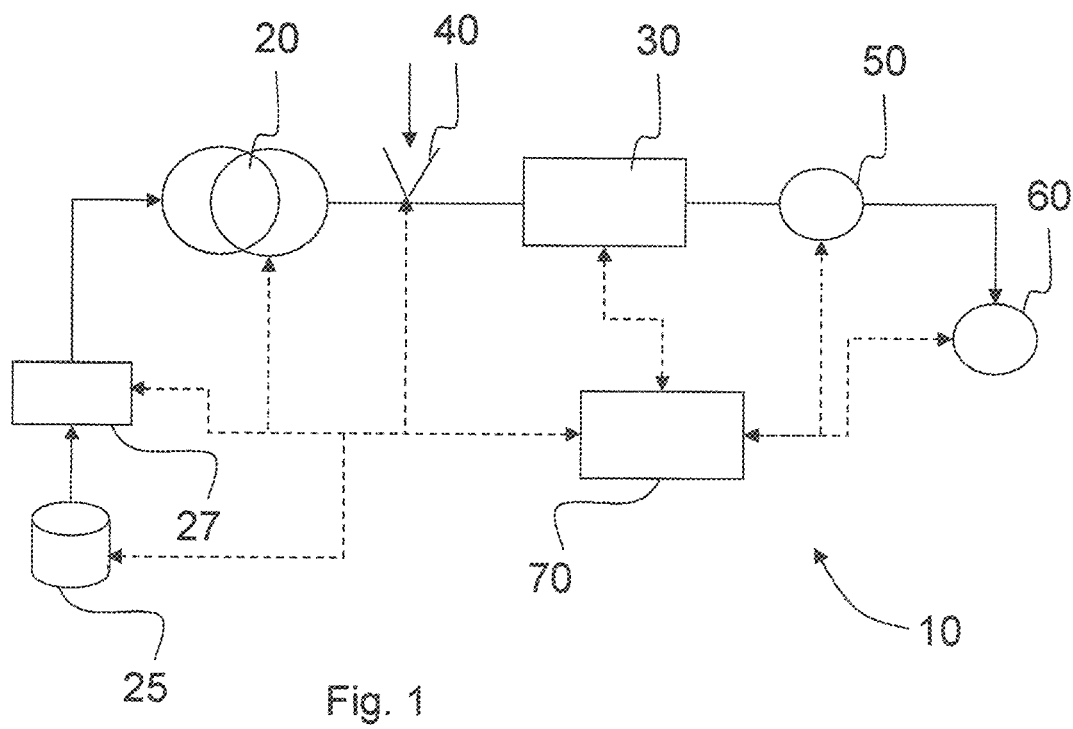
FIG. 1 illustrates a liquid chromatography system according to an exemplary embodiment.

Referring now in greater detail to the drawings, FIG. 1 depicts a general schematic of a liquid separation system 10. A mobile phase drive 20 (such as a pump) receives a mobile phase from a solvent supply 25, typically via a degasser 27, which degasses the mobile phase and thus reduces the amount of dissolved gases in it. The mobile phase drive 20 drives the mobile phase through a separating device 30 (such as a chromatographic column). A sample dispatcher 40 (also referred to as sample introduction apparatus, sample injector, etc.) is provided between the mobile phase drive 20 and the separating device 30 in order to subject or add (often referred to as sample introduction) portions of one or more sample fluids into the flow of a mobile phase (denoted by reference numeral 200, see also FIG. 2). The separating device 30 is adapted for separating compounds of the sample fluid, e.g. a liquid. A detector 50 is provided for detecting separated compounds of the sample fluid. A fractionating unit 60 can be provided for outputting separated compounds of sample fluid.

The separating device 30 may comprise a stationary phase configured for separating compounds of the sample fluid. Alternatively, the separating device 30 may be based on a different separation principle (e.g. field flow fractionation).

While the mobile phase can be comprised of one solvent only, it may also be mixed of plurality of solvents. Such mixing might be a low pressure mixing and provided upstream of the mobile phase drive 20, so that the mobile phase drive 20 already receives and pumps the mixed solvents as the mobile phase. Alternatively, the mobile phase drive 20 might be comprised of plural individual pumping units, with plural of the pumping units each receiving and pumping a different solvent or mixture, so that the mixing of the mobile phase (as received by the separating device 30) occurs at high pressure and downstream of the mobile phase drive 20 (or as part thereof). The composition (mixture) of the mobile phase may be kept constant over time, the so-called isocratic mode, or varied over time, the so-called gradient mode.

A data processing unit or control unit 70, which can be a conventional PC or workstation, might be coupled (as indicated by the dotted arrows) to one or more of the devices in the liquid separation system 10 in order to receive information and/or control operation. For example, the data processing unit 70 might control operation of the mobile phase drive 20 (e.g. setting control parameters) and receive therefrom information regarding the actual working conditions (such as output pressure, flow rate, etc. at an outlet of the pump). The data processing unit 70 might also control operation of the solvent supply 25 (e.g. monitoring the level or amount of the solvent available) and/or the degasser 27 (e.g. setting control parameters such as vacuum level) and might receive therefrom information regarding the actual working conditions (such as solvent composition supplied over time, flow rate, vacuum level, etc.). The data processing unit 70 might further control operation of the sample dispatcher 40 (e.g. controlling sample introduction or synchronization of the sample introduction with operating conditions of the mobile phase drive 20). The separating device 30 might also be controlled by the data processing unit 70 (e.g. selecting a specific flow path or column, setting operation temperature, etc.), and send—in return—information (e.g. operating conditions) to the data processing unit 70. Accordingly, the detector 50 might be controlled by the data processing unit 70 (e.g. with respect to spectral or wavelength settings, setting time constants, start/stop data acquisition), and send information (e.g. about the detected sample compounds) to the data processing unit 70. The data processing unit 70 might also control operation of the fractionating unit 60 (e.g. in conjunction with data received from the detector 50) and provides data back. The data processing unit 70 might also process the data received from the system or its part and evaluate it in order to represent it in adequate form prepared for further interpretation.

FIG. 2 illustrate preferred embodiments of a sample dispatcher 40 according to the present invention.

Figure 2A:
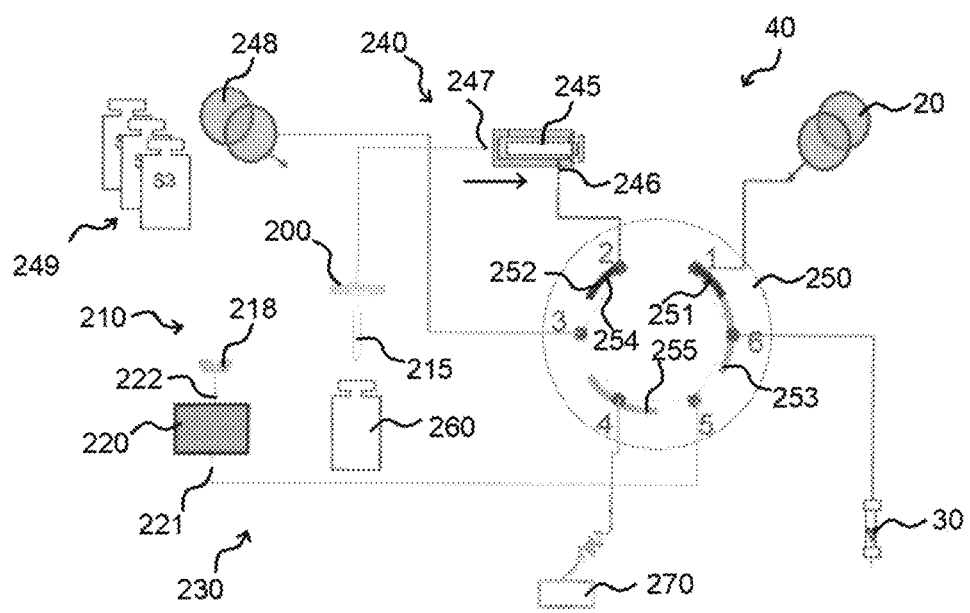
FIG. 2A illustrates a sample dispatcher according to an exemplary embodiment with a switching unit thereof in a first configuration.

FIG. 2A shows a sampling volume 200, a sampling unit 210 comprised of a needle 215 and a needle seat 218, and a retaining unit 220, all arranged in a serial connection and providing a sampling path 230. Further coupled to the sampling path 230 is a sampling fluid drive 240, which in the embodiment of FIG. 2 is comprised of a metering device 245 and a fluid pump 248. The fluid pump 248 is coupled to one or more solvent reservoirs 249 as schematically indicated in the drawings.

A switching unit 250 is coupling to the sampling path 230, the sampling fluid drive 240, the mobile phase drive 20, and the separating device 30, as will be explained later in more detail, in particular showing the various configurations of the switching unit 250.

The sampling volume 200 is configured for temporarily storing an amount of the received fluidic sample, and can be any of a sample loop, a sample volume, a trap volume, a trap column, a fluid reservoir, a capillary, a tube, a microfluidic channel structure.

The retaining unit 220 is configured for receiving and retaining from the sampling volume 200 at least a portion of the fluidic sample stored in the sampling volume 200. The retaining unit 220 is further configured to show different retention characteristics for different components of the fluidic sample. The retaining unit 220 can be embodied e.g. by one or more chromatographic columns, guard columns or SPE (solid phase extraction) columns, of which at least one has trapping capabilities for parts of the fluidic sample by means of, e.g. HILIC (hydrophilic interaction liquid chromatography), RP (reversed phase chromatography), NP (normal phase chromatography), IEX (ion exchange chromatography), HIC (hydrophobic interaction chromatography). Alternatively or in addition, the retaining unit 220 can be embodied by one or more coated capillaries and/or one or more filters (preferably one or more filter frits). In case of plural chromatographic columns and/or coated capillaries at least two of the chromatographic columns and/or coated capillaries are preferably configured having a different chromatographic separation mechanism.

FIG. 2A shows an open position of the sampling unit 210 wherein the needle 215 is physically separated from the needle seat 218, thus allowing the needle 215 to receive a fluidic sample e.g. from a sample vessel 260 (e.g. a vial) as indicated in the exemplary representation of FIG. 2A. It is clear that instead of the sample vessel 260, the fluidic sample may be provided to the needle 215 by any other way as known in the art, e.g. coupling to an online sampling loop is provided e.g. from a chemical or biological reactor. Further, instead of the needle 215 and the needle seat 218 any other mechanism for fluidically coupling to a fluidic sample can be applied accordingly, e.g. such aforementioned online sampling loop, as known in the art.

Figure 2B:
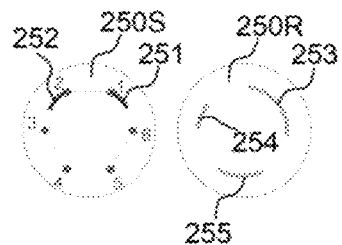
FIG. 2B illustrates a stator and a rotor of a valve of the switching unit illustrated in FIG. 2A.

In the exemplary embodiment of FIG. 2, the switching unit 250 is a rotational valve having a stator 250S and a rotor 250R, as shown in detail in FIG. 2B. The stator 250S has six ports (indicated by reference numerals 1-6 and each port allowing to couple e.g. a fluid conduit thereto as shown e.g. in FIG. 2A), a first static groove 251, and a second static groove 252. The first static groove 251 extends from port 1, and the second static groove 252 extends from port 2. The rotor 250R comprises a first (dynamic) groove 253, a second (dynamic) groove 254, and a third (dynamic) groove 255. While FIG. 2B shows the stator 250S and the rotor 250R separated from each other, the stator 250S and the rotor 250R are facing each other and are centrally aligned to each other (thus allowing a rotational movement relative to each other between the stator 250S and the rotor 250R as depicted in the different configurations of FIG. 2).

In FIG. 2, the mobile phase drive 20 is coupled to port 1, a first end 246 of the metering device 245 is coupled to port 2 while a second end 247 of the metering device 245 is coupled to the sampling volume 200. The fluid pump 248 is coupled to port 3. Port 4 is coupled to waste or any other fluidic unit as indicated by reference numeral 270. Port 5 is coupled to a first end 221 of the retaining unit 220 while the second end 222 of the retaining unit 220 is coupled to the needle seat 218. Port 6 is coupled to the separating device 30.

In FIG. 2A, the switching unit 250 is in a first configuration. The first groove 253 is coupling between ports 1 and 6, thus coupling the mobile phase drive 20 to the separating device 30, so that the mobile phase drive 20 drives the mobile phase through the switching unit 250 and the separating device 30. The first groove 253 is overlapping with the first static groove 251. The second groove 254 and the second static groove 252 are overlapping with each other but not reaching to any other port, so that port 2 is blocked, and thus also the first end 246 of the metering device 245 is blocked. The metering device 245 can provide a backwards movement (as indicated by the arrow in FIG. 2A) allowing the needle 215 to retrieve sample fluid from the vessel 260 (e.g. when the needle 215 is immersed into the vessel 260). By further backwards movement of the needle 215, the received sample fluid will also be drawn into the sampling volume 200 and can be temporarily stored therein.

Figure 2C:
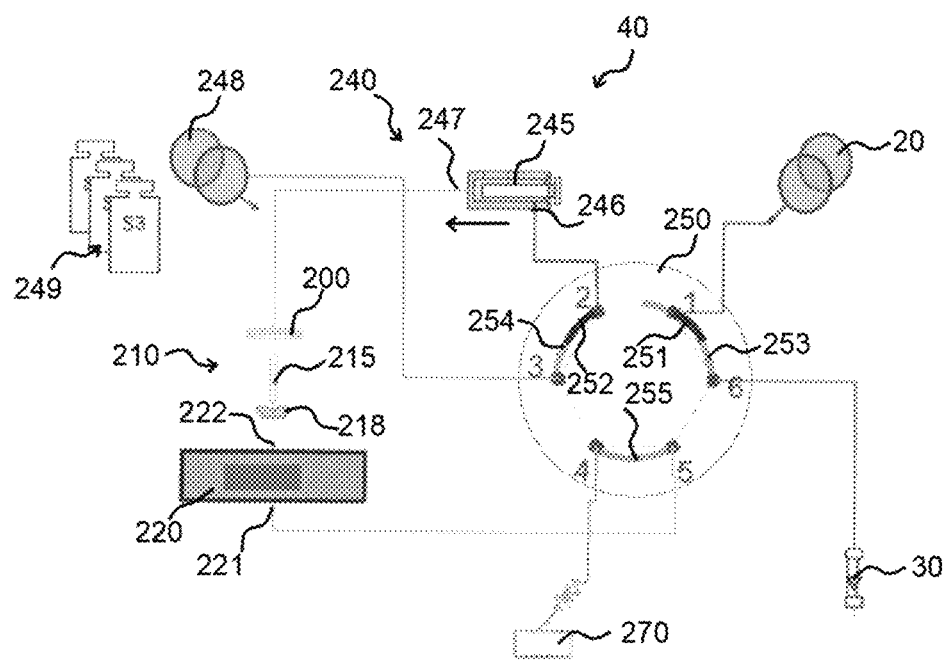
FIG. 2C illustrates the sample dispatcher illustrated in FIG. 2A with the switching unit in a second configuration.

FIG. 2C shows a second configuration of the switching unit 250, wherein the rotor 250R has been turned (e.g. anticlockwise in this embodiment) with respect to the first configuration shown in FIG. 2A. The first groove 253 is still coupling between the ports 1 and 6. The second groove 254 together with the second static groove 252 providing a fluidic connection between ports 2 and 3, so that the fluid pump 248 is coupled to the first end 246 of the metering unit 245. The third groove 255 is now coupling between ports 4 and 5. Further, the sampling unit 210 is now in a closed position with the needle 215 being physically connected and fluidically sealingly coupled with the needle seat 218 thus providing a fluid tight connection. With a forward movement of the metering device 245 (as indicated by the arrow in FIG. 2C), the sample fluid (or at least a part thereof) stored in the sampling volume 200 can be pushed into the retaining unit 220. With the first end 221 of the retaining unit 220 being coupled via the third groove 255 to waste 270, any fluid (which may include sample fluid) pushed beyond the retaining unit 220 may be pushed into waste 270.

In the second configuration as depicted in FIG. 2C, further processing of the fluidic sample as retained in the retaining unit 220 may be executed, as will be illustrated later.

Figure 2D:
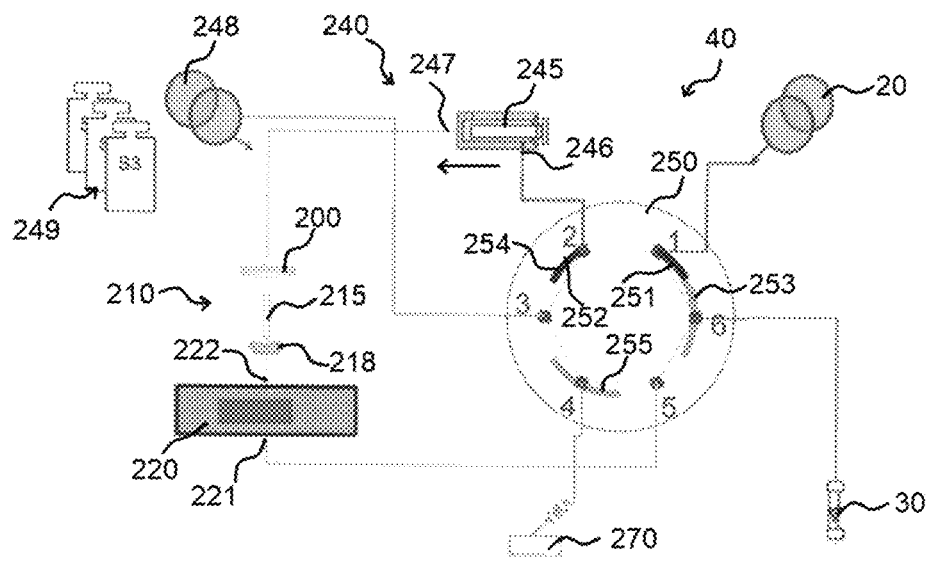
FIG. 2D illustrates the sample dispatcher illustrated in FIG. 2A with the switching unit in a third configuration.

FIG. 2D shows a third configuration of the switching unit 250 and substantially corresponds to FIG. 2A, with the only difference that the sampling unit 210 is in the closed position (with the needle 215 being physically connected and fluidically sealingly coupled with the needle seat 218). With the port 5 being blocked, thus also blocking the first end 221 of the retaining unit 220, a forward movement of the metering device 245 (as indicated by the arrow in FIG. 2D) will lead to a compression of any fluid content in the sampling path 230. This can be used for precompressing (i.e. increasing pressure) the sample fluid contained in the sampling path 230 and preferably retained within the retaining unit 220. Such precompression may be applied to a pressure in the range of a pressure of the mobile phase as provided by the mobile phase drive 20 in order to facilitate introduction of the sample fluid into the mobile phase, as will be shown in FIGS. 2E and 2F.

A backwards movement of the metering device 245 (opposite to the arrow in FIG. 2D) can lead to a decompression of any fluid content in the sampling path 230. This can be used for decompressing (i.e. reducing pressure) the sample fluid contained in the sampling path 230 and preferably retained within the retaining unit 220. Such decompression may be applied to an ambient pressure, e.g. after applying introduction of the sample fluid into the mobile phase as will be shown in FIGS. 2E and 2F, and/or before separating the needle 215 from the needle seat 218.

Figure 2E:
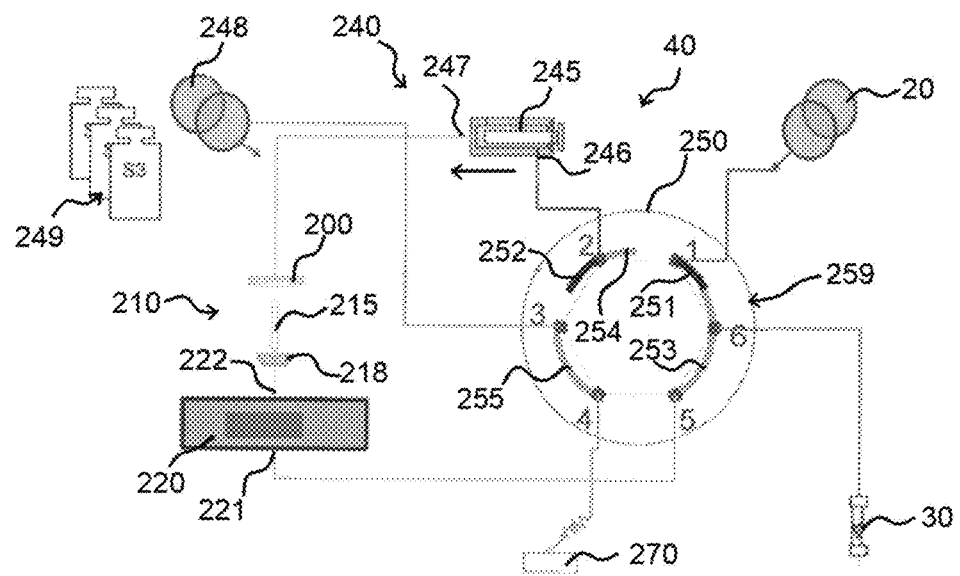
FIG. 2E illustrates the sample dispatcher illustrated in FIG. 2A with the switching unit in a fourth configuration.

FIG. 2E shows a fourth configuration of the switching unit 250 allowing a so-called feed injection into the mobile phase. Rotor 250R has been rotated and is positioned so that the first groove 253 together with the first static groove 251 are coupling ports 1, 6, and 5 fluidically together and representing a first coupling point 259. When the metering device 245 is applying a forward movement (as indicated by the arrow in FIG. 2E), fluid content retained on the retaining unit 220 can be pushed (fed) into the mobile phase. In other words, a flow within the sampling path 230 is combined in the first coupling point 259 with a flow of the mobile phase from the mobile phase drive 20, and the combined flow is provided towards the separating device 30.

Figure 2F:
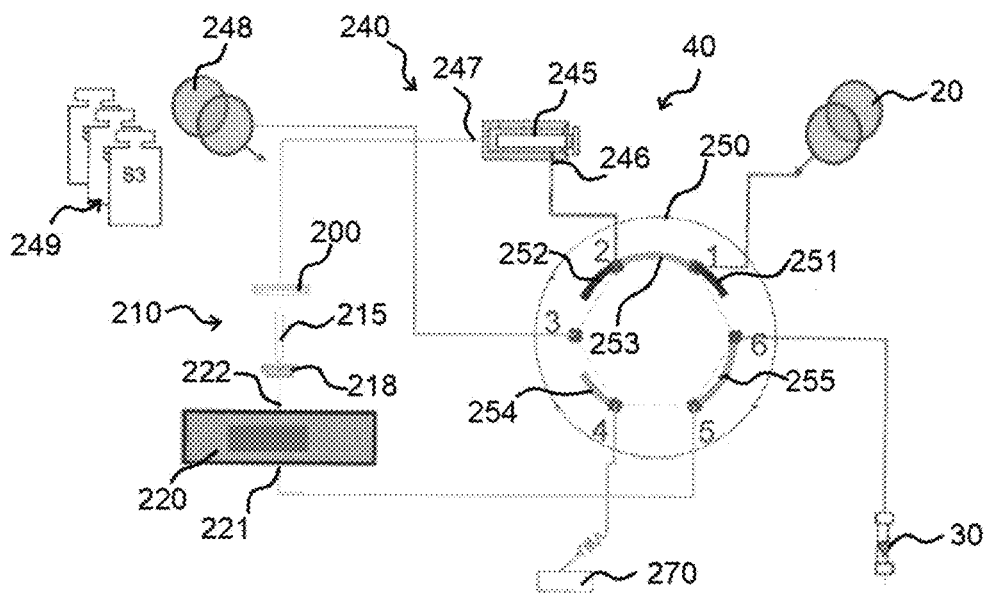
FIG. 2F illustrates the sample dispatcher illustrated in FIG. 2A with the switching unit in a fifth configuration.

FIG. 2F shows a fifth configuration of the switching unit 250 allowing a so-called flow through injection into the mobile phase. The first groove 253 is coupling between ports 1 and 2, and the third groove 255 is coupling between ports 5 and 6, so that the sampling path 230 (together with the metering device 245) is switched between the mobile phase drive 20 and the separating device 30. Accordingly, any sample fluid within the sampling path 230 and in particular within the trapping unit 220 will be transported by the mobile phase provided from the mobile phase drive 20 towards and through the separating device 30. In an alternate embodiment, e.g. a so-called fixed loop injection, not shown here, the metering device 245 can be separated from the sampling path 230, so that only the sampling path 230 will be switched between the mobile phase drive 20 and the separating device 30.

Figure 2G:
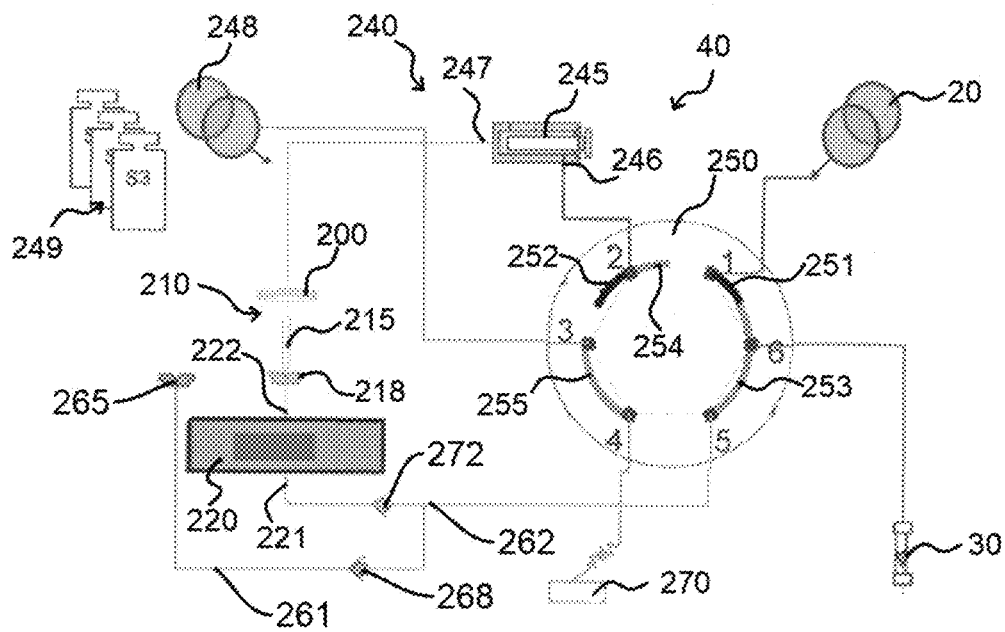
FIG. 2G illustrates a sample dispatcher according to another exemplary embodiment.

FIG. 2G shows an alternative embodiment of the sample dispatcher 40, wherein the sampling path 230 comprises a bypass path 261 coupling on one end to a second coupling point 262 located between the first end 221 of the retaining unit 220 and the port 5. The other end of the bypass path 261 provides an additional needle seat 265. The needle 215 may thus couple either into the needle seat 218 or into the additional needle seat 265. Coupling the needle 215 into the additional needle seat 265 allows bypassing the retaining unit 220, e.g. for introduction of the complete fluidic sample without additional retention and/or to selectively apply the sample to the retaining unit 220 or directly to the separation device 30 (or a second retaining unit having different properties), e.g. if a sample is not compatible with the retaining unit 220 while other samples are compatible. Additional flow directors may be provided for ensuring flow direction, such as a check valve 268 within the bypass path 261 to ensure a flow direction only from the additional needle seat 265 towards port 5, and/or a check valve 272 coupled between the first end 221 and the second coupling point 262 for ensuring a flow direction only in the direction from the first end 221 to the second coupling point 262. FIG. 2G is exemplarily depicted for the fourth configuration according to FIG. 2E, however, it is clear that the bypass path 261, e.g.

together with one or both of the check valve 268 and 272, can be applied also in any other configuration of the shown FIG. 2.

It is to be understood that the fluid pump 248 in the embodiment of FIG. 2 is optional and the functionality of the fluid pump 248, as e.g. illustrated above or in the applications below, can be carried out e.g. by the metering device 245 only. As an example, the solvent or solvent mixture (as would be provided by the fluid pump 248 from the solvent reservoirs 249) can also be coupled for loading into the metering device 245, e.g. by the needle 215. This, however, typically requires an extra step of separating the needle 215 from the needle seat 218, drawing in (e.g. aspirating) such solvent or solvent mixture, and moving the needle 215 back into the needle seat 218.

In an example (with the sampling fluid drive 240 comprising the metering device 245 only), the metering device 245 first aspirates fluidic sample via the needle 215 (when being separated from the needle seat 218 as depicted in FIG. 2A) and draws such aspirated fluidic sample into the sampling volume 200. By returning needle 215 into the needle seat 218 and switching the switching unit 250 into the second configuration of FIG. 2C, the metering device 245 can load the fluidic sample onto the retaining unit 220. The needle 215 may then again be separated from the needle seat 218 and draw a fluid (e.g. a solvent or solvent mixture) e.g. from any of the solvent reservoirs 249. After returning the needle 215 into the needle seat 218, the metering device 245 can then push the drawn in fluid over the retaining unit 220, e.g. for further processing the fluidic sample in the retaining unit 220. Such process of drawing in fluid and pushing such drawn in fluid over the retaining unit 220 can be applied one or multiple times, dependent on the respective application, e.g. with the same or different solvents. Before injecting the fluidic sample into the mobile phase via feed injection, e.g. using the fourth configuration of FIG. 2E, the needle 215 may (again) be removed from the needle seat 218, and the metering device 245 may aspirate/draw in an amount of elution solvent before the needle 215 is returned into the needle seat 218.

A few further exemplary applications shall be described the following. It is clear that these applications can be modified, and other applications are possible with the same or a different setup.

In one application, the switching unit 250 of the sample dispatcher 40 is first placed into the first configuration as shown in FIG. 2A. The metering device 245 provides a backwards movement (in the direction of the arrow in FIG. 2A) in order to draw a fluidic sample from the sample vessel 260 via the needle 215 into the sampling volume 200. The switching unit 250 is then switched into the second configuration as shown in FIG. 2C. The fluid pump 248 draws one or more solvents from the solvent reservoir 249 and pushes the solvent or the solvent mixture via the switching unit 250 and through the metering device 245 into the sampling path 230, which loads the fluidic sample (previously drawn into the sampling volume 200 and temporarily stored therein) from the sampling volume 200 into the retaining unit 220. After loading the fluidic sample into the retaining unit 220, the fluidic sample may optionally be further processed, e.g. by washing, desalting, biological, chemical, photochemical or thermal transformation/modification like derivatization or enzymatic digestion, or any other type of sample preparation may be applied. The switching unit 250 may then be switched into the third configuration, as depicted in FIG. 2D, and the metering device 245 applies a forward motion (as indicated by the arrow in FIG. 2D) in order to compress the fluid within the sampling path 230. Such optional step of "precompression" can be useful in order to avoid or at least reduce pressure fluctuations when introducing the fluidic sample into the mobile phase (e.g. by applying the fourth or fifth configuration of the switching unit 250 as depicted in the FIG. 2E or 2F). In order to introduce the fluidic sample into the mobile phase, the switching unit 250 can be switched in either one of the fourth configuration (for applying a so-called feed injection) or the fifth configuration (for applying a so-called flow through injection) as depicted in the FIG. 2E or 2F.

In one application, a step of desalting can be provided to the fluidic sample prior to injection into the mobile phase to remove nonvolatile salts, detergents, and solubilizing agents. The fluidic sample may be provided within the vessel 260 and drawn in by the metering device 245 via the needle 215 into the sampling volume 200, e.g. as shown in the first configuration of FIG. 2A. The needle 215 is then returned into the needle seat 218, the switching unit 250 is switched into the second configuration of FIG. 2C, and the metering device 245 may be moved forward as indicated by the arrow in FIG. 2C (or into a defined home position). In the second configuration, the fluid pump 248 can pump a flushing solvent (e.g. from one or more of the solvent reservoirs 249) via the metering device 245 into the sampling path 230 in order to flush the fluidic sample onto the retaining unit 220, which may be an SPE column with a silica or polymer-based, reversed-phase packing material e.g. provided as a removable cartridge which can be used to effectively desalt e.g. protein samples. The fluid pump 248 may then pump a different solvent (e.g. from one or more of the solvent reservoirs 249) containing plain solvents or volatile buffers in order to desalt (i.e. removing salt content from) the fluidic sample as retained within the retaining unit 220. This allows to lower salt concentration and/or change salt composition, as may be useful for subsequent processing of the fluidic sample, e.g. for chromatographic and/or mass-spectrometric separation. Any excess fluid pushed beyond the first end 221 of the retaining unit 220 may be flushed into waste or any other fluidic unit 270. The needle 215 may then be separated again from the needle seat 218 and may be connected to waste before flushing the sampling path 230 with an eluent, and the needle 215 is then returned into the needle seat 218. The switching unit 250 may then be moved into the fourth position of FIG. 2E, and the fluidic sample retained in the retaining unit 220 can then be feed-injected e.g. with a strong/harsh solvent onto the separation device 30 (e.g. a chromatographic column). For the sake of better understanding, the retained sample may not be eluted by the strong solvent and may also not necessarily go into high-pressure path towards the separating device 30. Alternatively, the switching unit 250 may be moved into the fifth position of FIG. 2F, and the fluidic sample retained in the retaining unit 220 can be flow-through injected into the mobile phase.

In the aforedescribed application as well as in other applications, at least one of the separating device 30 and the retaining unit 220 may be embodied as one of: Ion exchange column (e.g. for changing pH), HILIC (e.g. using methanol, acetonitrile, or water), Gel Filtration column (e.g. not providing permanent retention), Affinity column (e.g. providing immunoaffinity), etc.

In another application, trapping of polar compounds in the fluidic sample can be applied e.g. during feed injection. In such application, the switching unit 250 is first moved into the first configuration (as shown in FIG. 2A), the needle 215 is moved into the vessel 260, and the metering unit 245 can aspirate fluidic sample, which may be diluted within a strong solvent (e.g. high or pure ACN (acetonitrile) or mixtures with a high ACN percentage), into the sampling volume 200. The needle 215 is returned into the needle seat 218, and the switching unit 250 is moved into the fourth configuration (FIG. 2E). The fluid pump 248 can then feed the fluidic sample stored within the sampling volume 200 via the retaining unit 220 (which preferably is configured as a HILIC column) onto the separating device 30 (which preferably is configured as a reversed phase (RP) column) e.g. using a proper feed speed (e.g. a very low feed speed allowing proper mixing with the highly aqueous mobile phase to allow retaining of less polar compounds on the separating device 30). The switching unit 250 is moved into the second position (FIG. 2C), and the mobile phase drive 20 starts providing a gradient solvent, i.e. the composition of two solvents is varied over time, e.g. with one solvent being an aqueous mobile phase (e.g. water) and one solvent being an organic solvent (e.g. ACN). In an example, the gradient may start with hundred percent water and may go up to 95% organic (e.g. ACN), resulting in a complete elution of the less polar compounds from the RP column while the polar compounds are still retained on the retaining unit (e.g. HILIC column configuration). After applying the gradient solvent (via the switching unit 250 being in the second configuration (FIG. 2C)), the switching unit 250 is moved in the fifth configuration (FIG. 2F), and the mobile phase drive 20 starts providing another gradient solvent, e.g. starting with 95% organic (e.g. ACN) and may go up to 100% water, in order to elute the fluidic sample retained by the retaining unit 220 (e.g. HILIC) towards the separating device 30 (e.g. RP). The retaining unit 220 may then be equilibrated (preferably with an organic solvent, e.g. ACN or mixtures of up to 95% ACN and water, or by flushing the column 30 with a certain volume of a suitable solvent of e.g. a certain pH or ionic strength or organic content etc., e.g. to ensure best (binding/retention) performance by reconstituting/re-activating the relevant surface chemistry (the chemical groups that interact with the sample molecules). The separating device 30 is equilibrated with up to 100% aqueous mobile phase by the mobile phase drive 20 after completing the gradient going up to 100% aqueous mobile phase.

Monoclonal antibodies (mAbs) represent a major category of therapeutic proteins. Various analytical tools are required to monitor mAb heterogeneity. Liquid chromatography/mass spectrometry (LC/MS) is a routine technology used for characterization of these biomolecules. For preparation and storage, mAbs solutions often contain nonvolatile salts and/or solubilizing or cryoprotectantagents. The presence of these reagents causes adverse effects in mass spectrometry, suppressing ionization, which limits LC/MS application. With the aforedescribed application, it is possible to remove these salts and additives before MS analysis and to provide a simple but effective desalting or buffer exchange and (small volume) Online SPE workflows using a retaining device e.g. containing Protein A. Additional to that, it is possible to do feed injection like injections e.g. from a cartridge/trapping column. Using 3 different solvents (or more), it is fairly easy to flush the cartridge/trapping column with different solvent such as very high organic for cleaning.

It is clear that mABs is only one example, but it also applies to most other proteins. Desalting, buffer exchange procedures or any kind of cleaning/washing steps (plus the ability for online modification or transformation) could be beneficial for almost all samples, although proteins are probably most sensitive.

Figure 3A:
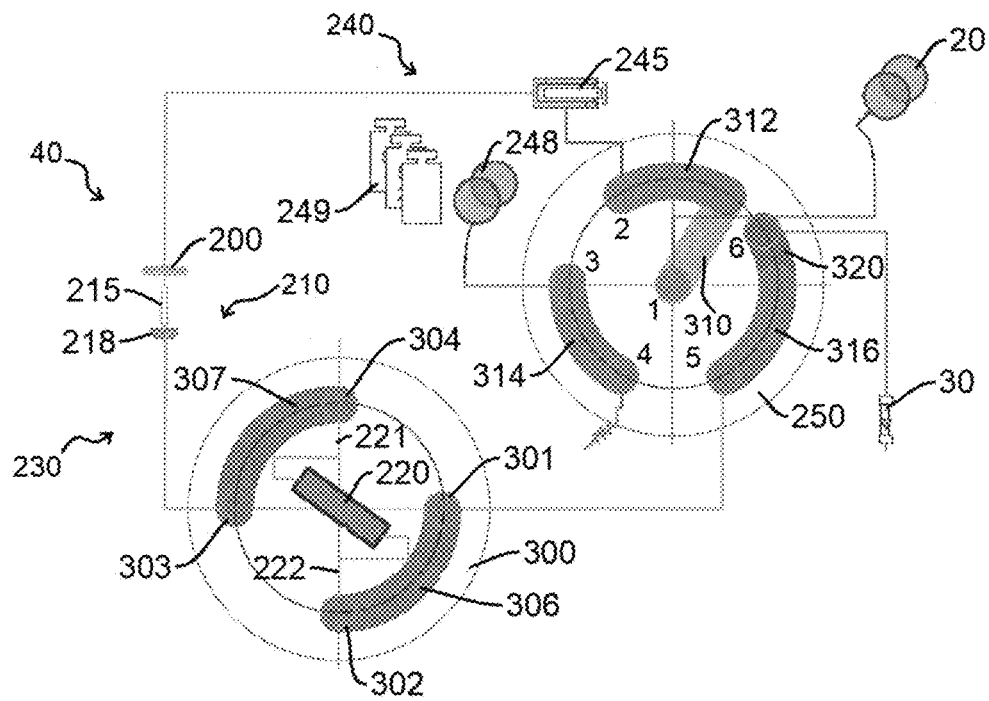
FIG. 3A illustrates a sample dispatcher according to another exemplary embodiment with switching units thereof in a flow-through injection position.
Figure 3B:
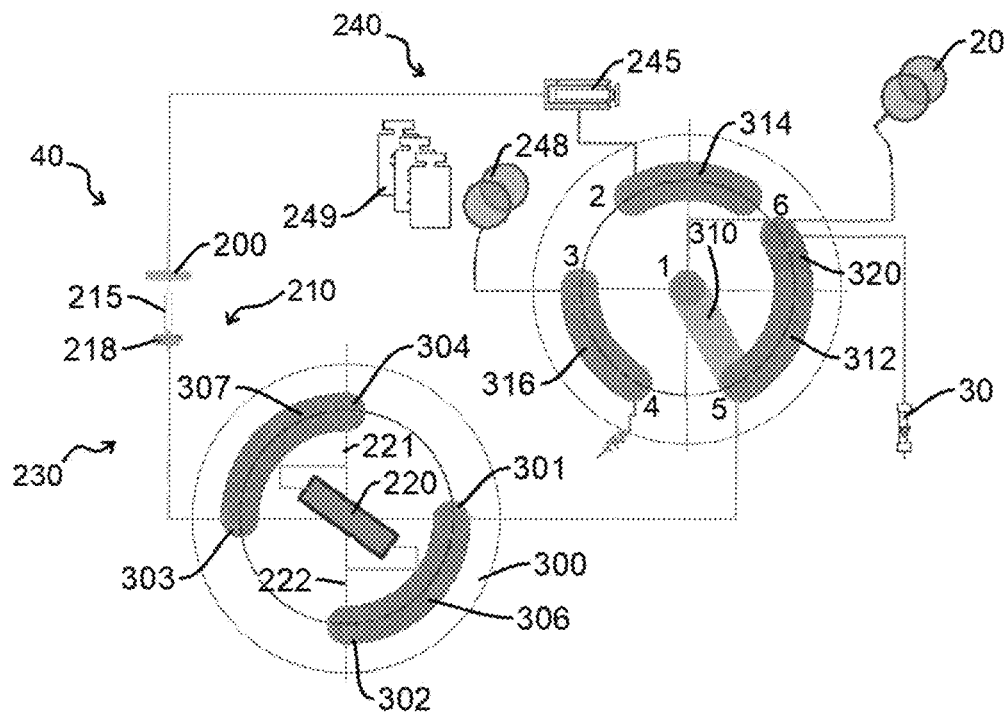
FIG. 3B illustrates the sample dispatcher illustrated in FIG. 3A with the switching units in a feed injection position.
Figure 3C:
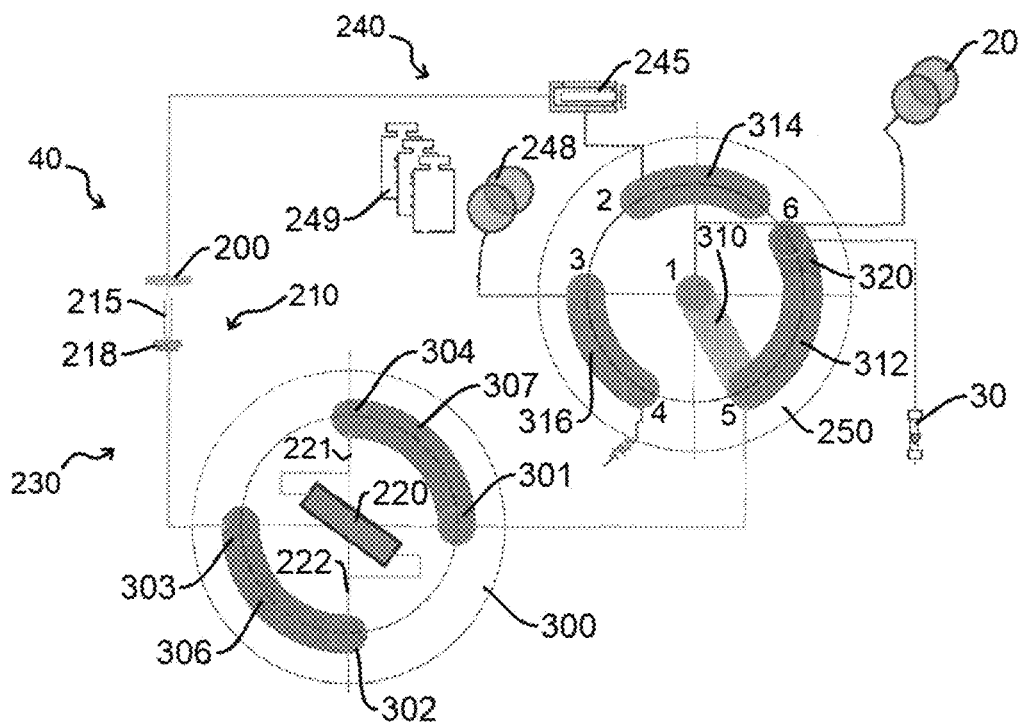
FIG. 3C illustrates the sample dispatcher illustrated in FIG. 3A with the switching units in a feed injection position, and with reversed flow in a retaining unit thereof in comparison to FIG. 3B.

FIGS. 3A-3C illustrate another preferred embodiment of the sample dispatcher 40 according to the present invention. The embodiment of FIG. 3 further allows reversing flow direction through the retaining unit 220. Reversing the flow direction can be useful for receiving fluidic sample as well as for ejecting received and retained fluidic sample towards the separating device 30. For that purpose, a second switching unit 300, which may be embodied as a rotational valve as depicted in FIG. 3, is coupled between the sampling unit 210 and port 5 of the (first) switching unit 250.

In the exemplary embodiment of FIG. 3, the second switching unit 300 has four ports 301-304 (as stator) and two grooves 306, 307 (as rotor). The first end 221 of the retaining unit 220 is coupled to port 304 while the second end 222 of the retaining unit 220 is coupled to port 302. Rotating the grooves 306, 307 by 90 degree in either direction will reverse the flow direction through the retaining unit 220 between the sampling unit 210 and port 5 of the switching unit 250.

In the embodiment of FIG. 3A, port 1 of the switching unit 250 is now in a central position, and a radial groove 310 is coupling from port 1 to a first circular groove 312. The switching unit 250 further comprises a second circular groove 314 and a third circular groove 316. All three circular grooves 312-316 as well as the radial groove 310 are preferably part of the rotating element (rotor) of the switching unit 250. Ports 2-6 are preferably part of the stationary element (stator) of the switching unit 250 with port 6 having an elongated stator groove 320 and also being part of the stationary element. In operation, while the stationary elements of the switching unit 250 remain in position, the rotating elements can be rotated in a circular manner as indicated in the FIG. 3 and known in the art.

FIG. 3A shows the sample dispatcher 40 in a flow through injection position (similar to the embodiment shown in FIG. 2F). The sampling path 230 can thus be coupled between the mobile phase drive 20 and the separating device 30.

FIGS. 3B and 3C show the sample dispatcher 40 in a feed injection position (similar to the embodiment shown in FIG. 2E). A flow within the sampling path 230 can thus be combined in a coupling point provided by port 5 with a flow of the mobile phase from the mobile phase drive 20, and the combined flow is provided towards the separating device 30.

With the position of the second switching unit 300 as shown in FIGS. 3A and 3B, the first end 221 of the retaining unit 220 is coupled to the sampling unit 210 while the second end 222 of the retaining unit 220 is coupled to port 5 of the switching unit 250. Accordingly, with the direction of the fluid flow being from the sampling unit 210 towards the retaining unit 220 (in both ejection schemes of flow through injection in FIG. 3A and feed injection in FIG. 3B), the retaining unit 220 will be flown through from the first end 221 towards the second end 222.

Rotating the grooves 306, 307 by 90 degree in either direction will reverse the flow direction in the retaining unit 220 between the sampling unit 210 and port 5 of the switching unit 250. This is exemplarily indicated in FIG. 3C (with respect to the position of the second switching unit 300). The second end 222 of the retaining unit 220 is now coupled to the sampling unit 210 while the first end 221 of the retaining unit 220 is coupled to port 5 of the switching unit 250. Accordingly, with the direction of the fluid flow being from the sampling unit 210 towards the retaining unit 220 (in both ejection schemes of flow through injection in FIG. 3A and feed injection in FIG. 3C), the retaining unit 220 will be flown through from the second end 222 towards the first end 221.

Reversing the flow direction through the retaining unit 220 may allow, for example, increasing the lifetime of the retaining unit 220, e.g. by avoiding or reducing plugging, and/or increasing the performance of the retaining unit 220.

The invention claimed is:

1. A sample dispatcher for a fluid separation apparatus, wherein the fluid separation apparatus comprises a mobile phase drive, configured for driving a mobile phase, and a separating device configured for separating a portion of a fluidic sample when comprised within the mobile phase, the sample dispatcher comprising:
a sampling path comprising a sampling volume, a sampling unit, and a retaining unit, wherein:
the sampling unit is configured for receiving the fluidic sample,
the sampling volume is configured for temporarily storing an amount of the received fluidic sample, and
the retaining unit is configured for receiving and retaining from the sampling volume at least a portion of the fluidic sample stored in the sampling volume, wherein the retaining unit comprises different retention characteristics for different components of the fluidic sample; and
a switching unit coupling to the sampling path, a sampling fluid drive, the mobile phase drive, and the separating device,
wherein the sampling fluid drive is configured for moving at least a portion of the fluidic sample received by the sampling unit into the sampling volume, for moving at least a portion of the fluidic sample stored in the sampling volume into the retaining unit, and for introducing via the switching unit at least a portion of the fluidic sample retained by the retaining unit into the mobile phase upstream to the separating device; and
in a feed injection configuration of the switching unit, the mobile phase drive, the separating device, and the sampling path are coupled together in a coupling point, the sampling fluid drive is coupled to the sampling path for combining into the coupling point a flow from the sampling fluid drive with a flow of the mobile phase from the mobile phase drive, and the flow from the sampling fluid drive is through the sampling path and containing the fluidic sample retained by the retaining unit.

2. The sample dispatcher according to claim 1, comprising at least one of the following:
the sampling volume, the sampling unit, and the retaining unit are coupled in series within the sampling path;
the sampling unit comprises a needle and a needle seat, wherein in an open position of the sampling unit the needle is configured to be separated from the needle seat in order to receive the fluidic sample, and in a closed position of the sampling unit the needle is configured to be fluidically sealingly coupled with the needle seat;
the sampling volume comprises at least one of a group of: a sample loop, a sample volume, a trap volume, a trap column, a fluid reservoir, a capillary, a tube, a microfluidic channel structure the sampling volume comprises at least one of a group of: a sample loop, a sample volume, a trap volume, a trap column, a fluid reservoir, a capillary, a tube, a microfluidic channel structure.

3. The sample dispatcher according to claim 1, wherein:
the retaining unit comprises a component selected from the group consisting of: one or more chromatographic columns; one or more trapping columns; one or more HILIC columns; one or more guard columns; one or more SPE columns; one or more coated capillaries; one or more filters; one or more filter frits; a plurality of chromatographic columns wherein at least two of the chromatographic columns have a different chromatographic separation mechanism; and a plurality of coated capillaries wherein at least two of the coated capillaries have a different chromatographic separation mechanism.

4. The sample dispatcher according to claim 1, comprising at least one of:
the switching unit comprises a valve coupling to the sampling path, the sampling fluid drive, the mobile phase drive, and the separating device;
in a first configuration of the switching unit, the mobile phase drive is coupled to the separating device, and the sampling fluid drive is coupled to the sampling path for at least one of: receiving the fluidic sample by the sampling unit, and moving the portion of the fluidic sample received by the sampling unit into the sampling volume, wherein a first end of the sampling fluid drive is coupled to the sampling path;
in a second configuration of the switching unit, the mobile phase drive is coupled to the separating device, and the sampling fluid drive is coupled to the sampling path for at least one of: receiving the fluidic sample by the sampling unit, and moving the portion of the fluidic sample received by the sampling unit into the sampling volume, wherein a first end of the sampling fluid drive is coupled to the sampling path, and a second end of the sampling path is open and allowing a fluid transport beyond the second end;
in a third configuration of the switching unit, the mobile phase drive is coupled to the separating device, and the sampling fluid drive is coupled to the sampling path for compressing or decompressing the fluidic sample in the sampling path, wherein a first end of the sampling fluid drive is coupled to the sampling path, and a second end of the sampling path is closed and disabling a fluid transport beyond the second end;
in a flow through configuration of the switching unit, the sampling path is coupled between the mobile phase drive and the separating device for introducing the portion of the fluidic sample retained by the retaining unit into the mobile phase.

5. The sample dispatcher according to claim 1, wherein:
the sampling fluid drive comprises at least one of: a metering device; a fluid pump.

6. The sample dispatcher according to claim 1, wherein:
the sampling fluid drive is coupled in series within the sampling path between the sampling volume and the switching unit.

7. The sample dispatcher according to claim 1, comprising at least one of:
the sampling fluid drive comprises a fluid pump configured for driving an auxiliary fluid;
the sampling fluid drive comprises a first reservoir of an auxiliary fluid;
the sampling fluid drive comprises a first reservoir of an auxiliary fluid, wherein the auxiliary fluid is a solvent or a solvent mixture.

8. The sample dispatcher according to claim 1, further comprising one of:
a bypass path configured for bypassing the retaining unit;
a bypass path configured for bypassing the retaining unit, wherein the bypass path is coupled on one end to a second coupling point, located between one end of the retaining unit and the switching unit, and the other end of the bypass path provides a needle seat allowing to couple with the needle.

9. The sample dispatcher according to claim 1, further comprising:
a control unit configured to control an operation of the sample dispatcher, the operation comprising at least one of: operation of the sampling fluid drive; switching of the switching unit.

10. A fluid separation apparatus, comprising:
a mobile phase drive configured for driving a mobile phase;
a separating device configured for separating a portion of a fluidic sample when comprised within the mobile phase; and
the sample dispatcher according to claim 1, configured for dispatching at least a portion of the fluidic sample to the fluid separation apparatus.

11. The sample dispatcher according to claim 1, wherein:
the sampling fluid drive comprises a metering device comprised within the sampling path, and a fluid pump external to the sampling path and coupling to the switching unit.

12. The sample dispatcher according to claim 11, wherein further comprising at least one of:
in a first configuration of the switching unit, the metering device is configured for moving the portion of the fluidic sample received by the sampling unit into the sampling volume;
in a first configuration of the switching unit, the metering device is configured to enable pressurizing or depressurizing a fluid content within the retaining unit;
in a first configuration of the switching unit, the metering device is configured to enable pressurizing or depressurizing a fluid content within the retaining unit, in that the switching unit fluidically blocks one end of the sampling path coupled to the switching unit;
in a second configuration of the switching unit, the fluid pump is configured for moving the portion of the fluidic sample stored in the sampling volume into the retaining unit; and
in the feed injection configuration of the switching unit, the metering device is further configured for introducing the portion of the fluidic sample retained by the retaining unit into the mobile phase upstream to the separating device.

13. A method of dispatching at least a portion of a fluidic sample to a fluid separation apparatus, wherein the fluid separation apparatus comprises a mobile phase drive configured for driving a mobile phase, and a separating device configured for separating a portion of a fluidic sample when comprised within the mobile phase the method comprising:
providing a sample dispatcher comprising:
a sampling path comprising a sampling volume, a sampling unit, and a retaining unit; and
a switching unit configured to couple to the sampling path, a sampling fluid drive, the mobile phase drive, and the separating device,
wherein the sampling fluid drive is configured to move at least a portion of the fluidic sample received by the sampling unit into the sampling volume, and to move at least a portion of the fluidic sample stored in the sampling volume into the retaining unit;
receiving the fluidic sample by the sampling unit;
temporarily storing an amount of the received fluidic sample in the sampling volume;
at the retaining unit, receiving and retaining from the sampling volume at least a portion of the fluidic sample stored in the sampling volume, wherein the retaining unit comprises different retention characteristics for different components of the fluidic sample; and
introducing, via the switching unit, at least a portion of the fluidic sample retained by the retaining unit into the mobile phase upstream of the separating device, wherein:
during the introducing, the mobile phase drive, the separating device, and the sampling path are coupled together in a coupling point, and the sampling fluid drive is coupled to the sampling path; and
the introducing comprises combining into the coupling point a flow from the sampling fluid drive with a flow of the mobile phase from the mobile phase drive, wherein the flow from the sampling fluid drive is through the sampling path and contains the fluidic sample retained by the retaining unit.

14. The method according to claim 13, further comprising preparing the retained fluidic sample before introducing into the mobile phase, by at least one of:
washing; biological and/or chemical transformation and/or modification; derivatization; desalting; enzymatic reaction.

15. A non-transitory computer-readable medium, comprising instructions stored thereon, that when executed on a processor, control or perform the method of claim 13.

* * * * *